United States Patent [19]

Shawl

[11] 4,202,986
[45] May 13, 1980

[54] PREPARATION OF DIPHENYLMETHANE DICARBAMATES AND POLYMETHYLENE POLYPHENYL CARBAMATES WITH LEWIS ACID CATALYSTS INTERCALATED IN GRAPHITE

[75] Inventor: Edward T. Shawl, Wallingford, Pa.

[73] Assignee: Atlantic Richfield Company, Los Angeles, Calif.

[21] Appl. No.: 11,300

[22] Filed: Feb. 12, 1979

[51] Int. Cl.² .......................................... C07C 125/04
[52] U.S. Cl. .................................. 560/25; 260/453 P
[58] Field of Search ........................................ 560/25

[56] References Cited

U.S. PATENT DOCUMENTS

| | | | |
|---|---|---|---|
| 2,946,768 | 7/1960 | Klauke et al. | 560/25 |
| 4,146,727 | 3/1979 | Shawl | 560/25 |

Primary Examiner—Bernard Helfin
Assistant Examiner—G. T. Breitenstein
Attorney, Agent, or Firm—Delbert E. McCaslin

[57] ABSTRACT

Diphenylmethane dicarbamates and polymethylene polyphenyl carbamate homologs and derivatives of these compounds are produced by the condensation of N-aryl carbamic acid esters, such as ethylphenylcarbamate, with a carbonyl compound selected from formaldehyde, para-formaldehyde or trioxane at a temperature of between about ambient and 170° C. in the presence of a Lewis acid intercalated in graphite and optionally in the presence of an inert solvent.

15 Claims, No Drawings

PREPARATION OF DIPHENYLMETHANE DICARBAMATES AND POLYMETHYLENE POLYPHENYL CARBAMATES WITH LEWIS ACID CATALYSTS INTERCALATED IN GRAPHITE

FIELD OF THE INVENTION

The present invention relates to a process for the preparation of esters of aromatic carbamic acids (urethanes) particularly diphenylmethane dicarbamates and related higher homologs and derivatives by condensing an N-aryl carbamic acid ester with a carbonyl compound in the presence of a Lewis acid intercalated in graphite.

BACKGROUND OF THE INVENTION

Polymeric aromatic carbamic acid esters (polyurethanes) such as diphenylmethane dicarbamates and the related higher homologs polymethylene polyphenyl carbamates have become increasingly important products, particularly for use in the preparation of the commercially valuable diphenylmethane diisocyanates and mixtures of diisocyanates and polyisocyanates by the decomposition of such polymeric aromatic carbamic acid esters in a suitable solvent as shown, for example, in Rosenthal et al, U.S. Pat. Nos. 3,962,302 and 3,919,279.

At the present time there is no known successful commercial method for the direct prepartion of polymeric aromatic esters of carbamic acid. The corresponding diphenylmethane diisocyanates and polyisocyanates, available commercially, are largely produced by the phosgenation of mixtures of diamines and polyamines obtained by the condensation of aniline and formaldehyde with catalytic quantities of a mineral acid, as for example, disclosed in the Pistor et al, U.S. Pat. No. 4,041,914.

Prior art processes have been proposed for the preparation of polymeric aromatic carbamic acid esters (polyurethanes) as for example in Klauke et al, U.S. Pat. No. 2,946,768 and British Pat. No. 461,352 which disclosed the condensation of aryl carbamic acid esters with carbonyl compounds such as aldehydes and ketones in a dilute aqueous mineral acid condensation medium. In such processes the carbonyl compound such as formaldehyde tends to react at the nitrogen of the carbamate to produce along with the desired polyurethanes, substantial amounts, i.e., generally between 15 percent and 50 percent by weight, of undesirable N-(alkoxycarbonyl)phenylaminomethylphenyl compounds which includes dimers, trimers, tetramers, etc. of such compounds, which compounds referred to as "N-benzyl" compounds are fully described in co-pending U.S. application, Ser. No. 905,705, filed May 15, 1978, now U.S. Pat. No. 4,146,727. Attempts to prepare diisocyanates and polyisocyanates or to otherwise use the mixture containing the polyurethanes and such amounts of the undesired compounds, which compounds cannot be converted to an isocyanate by pyrolysis, presents many problems since there is no known method for separating the polyurethanes from the N-(alkoxycarbonyl)-phenylaminomethylphenyl impurities.

In addition, the liquid acid catalysts such as sulfuric or a sulfonic acid must be separated from the reaction mixture, usually by extensive water washing and the recovered acid reconcentrated for the normally desirable recycle and reuse.

The present invention which comprises the preparation of diphenylmethane dicarbamates and polymethylene polyphenylcarbamate homologs and derivatives of these compounds by the condensation of N-aryl carbamic acid esters with formaldehyde, para-formaldehyde or trioxane in the presence of a graphite supported Lewis acid catalyst such as aluminum trichloride, iron (III) chloride and antimony pentafluoride yields a product relatively low in N-benzyl content while at the same time it improves the process by using an acid catalyst which is substantially insoluble in the reaction medium and thus eliminates problems of acid recovery. The catalyst may be recovered from the reaction mixture by simple filtration and dried.

While the process of the invention is a one step condensation process, it is often convenient to further treat the condensation reaction product with additional Lewis acid or other solid acid catalyst, after removal of water made during the condensation reaction, to convert or rearrange any contained "N-benzyl" compounds to the desirable carbamates as described in the above mentioned U.S. application, Ser. No. 905,705, filed May 15, 1978, now U.S. Pat. No. 4,146,727, and the catalyst again recovered simply by filtration.

The graphite supported Lewis acid catalysts (intercalation compounds) of the instant invention also substantially eliminate corrosion problems and the undesirable side reactions such as sulfonation of the N-aryl carbamates and chlorination which occur for example with sulfuric and hydrochloric acid. Since the side reactions are suppressed, a higher quality diphenylmethane dicarbamate and polymethylene polyphenyl carbamate product can be obtained which upon pyrolysis to the polymeric aromatic isocyanate gives a higher isocyanate yield.

SUMMARY OF THE INVENTION

This invention relates to a process for the preparation of diphenylmethane dicarbamates and the higher molecular weight homologs, polymethylene polyphenyl carbamates, which comprises condensing an N-aryl carbamic acid ester with a carbonyl compound such as formaldehyde, para-formaldehyde or trioxane or mixtures thereof in the presence of a Lewis acid intercalated with graphite, i.e., the intercalation compounds of metal halides.

It is an object of the present invention therefore to provide a process for the preparation of diphenylmethane dicarbamates and the related polymethylene polyphenyl carbamates in high yield by the condensation of an N-aryl carbamic acid ester with a carbonyl compound in the presence of intercalation compounds of graphite with Lewis acids.

It is another object of this invention to provide a process for the condensation of N-aryl carbamic acid esters with formaldehyde, para-formaldehyde or trioxane in the presence of a graphite supported Lewis acid and substantially avoid the problems associated with the employment and recovery of the soluble liquid acids.

These and other objects and advantages of this invention will become apparent from the description of the invention which follows and from the claims.

DESCRIPTION OF THE INVENTION

In accordance with the present invention an aromatic carbamic acid ester (N-arylcarbamic acid ester) such as for example, a lower alkyl ester of phenyl carbamic acid, particularly ethylphenylcarbamate, is contacted with formaldehyde, para-formaldehyde or trioxane at a temperature of from about ambient to about 170° C., preferably under atmospheric pressure, with or without the addition of an inert solvent, in the presence of a graphite supported Lewis acid catalyst (intercalation compound) to give a reaction product mixture of diphenylmethane dicarbamates and polymethylene polyphenyl carbamates.

The graphite supported Lewis acid catalyzed condensation reaction may be carried out in any suitable reactor which is generally equipped with a means for agitation and a means for regulating temperature. A general procedure for carrying out the reaction in a batch process, for example, is to charge the N-aryl carbamic acid ester and optionally a solvent into the reaction vessel together with the desired carbonyl compound, e.g., trioxane, add the solid acid catalyst and then heat or cool the mixture, if necessary, to the desired reaction temperature for the appropriate period. Heating and/or cooling means may be employed interior and/or exterior of the reaction to maintain the temperature within the desired range. The reaction may be carried out as a batch, semi-continuous or a continuous process and the order of addition of the materials may be varied to suit the particular apparatus employed. The reaction products are recovered and treated by any conventional method such as filtration to remove the catalyst medium employed as well as distillation to remove water and any solvent employed. The process is particularly well suited for continuous operation in which the carbamate, preferably with a solvent, and formaldehyde may be passed through a column or bed of the graphite supported Lewis acid catalyst heated to the desired temperature.

The N-aryl carbamic acid esters employed as reactants in the Lewis acid/graphite catalyzed condensation reaction must contain one or more carbamic acid ester groups, i.e., —NHCOOR groups, wherein R is an alkyl group containing up to 8 carbon atoms, an aryl group or alkyl substituted aryl group having up to 4 carbon atoms in the alkyl substituent. The N-aryl group of the carbamic acid ester may also contain substituents such as alkyl, alkoxy, halogen, etc. on the ring. The lower alkyl esters, e.g., ethyl esters such as ethylphenylcarbamate are preferred. The N-aryl carbamic acid esters for use in the invention may be prepared for example by the process disclosed in Zajacek et al, U.S. Pat. No. 3,895,054 wherein the carbamic acid esters (urethanes) are prepared by reacting an organic compound containing at least one hydroxyl group with carbon monoxide and a nitrogenous organic compound at elevated temperature and pressure in the presence of a selenium catalyst and a base and/or water or by any other known process for preparing aromatic carbamates.

The carbonyl compounds which may be employed in the process of the invention are formaldehyde or para-formaldehyde and trioxane which are capable of producing monomeric formaldehyde in the presence of acid. The quantity of the carbonyl compound employed in the reaction relative to the N-aryl carbamic acid ester employed is based on the degree of condensation or polymerization desired in the reaction product. Generally, the molar ratio of N-aryl carbamic acid ester to the carbonyl compound, in the form of free formaldehyde in the reaction mixture, will be in the range of about 1.5 to 8:1 At the high end of the range the production of dimeric carbamates will predominate whereas at the low end of the range the higher polymeric polymethylene polyphenyl carbamates will predominate.

The graphite supported Lewis acid medium employed as condensation catalyst and suitable for use in the present invention may be, for example, iron (III) chloride, chromium chloride, palladium chloride, nickel chloride, cobalt chloride, aluminum trichloride and antimony pentafluoride intercalated in graphite (sold for example, commercially as "Graphimet" by the Alfa Division of Ventron Corp.) as well as for example, cupric chloride and bromide, boron trifluoride and trichloride, aluminum tribromide, molybdenum chloride and tungsten chloride intercalated in graphite and prepared, for example, by heating graphite with the chlorides or bromides, etc. and other known methods as described for example in an article by R. C. Croft, Australian Journ. Of Chem., Vol. 9, pp. 184–193, (1956). Generally the amount of the metal halide (Lewis acid) in the graphite will range from about 1 to 50 weight percent and usually between about 10 and 30 weight percent. In the process of this invention the Lewis acids per se intercalated in graphite are generally employed in concentrations of at least 0.5 weight percent and preferably in a range of from 0.5 to 30 weight percent based on the total reaction mixture. Mixtures of graphite supported Lewis acids may be employed, but are not preferred. The graphite compounds are referred to as intercalation compounds, lamellar compounds or interstitial compounds for they are formed by elements or compounds fitting in between the planar carbon networks as described in Kirk and Othmer, Encyclopedia of Chem. Technology, 2nd Ed., Vol. 4, p. 311.

Although the process of the present invention may be carried out in the absence of solvents, particularly at the higher temperatures of reaction, i.e., 60° C. and above, solvents or mixtures of solvents which are stable and chemically inert to the components of the reaction system may be and are generally employed due to the viscosity of the condensed reaction product. Suitable solvents which may be employed generally in amounts of from 0 to 50 weight percent based on the reaction mixture include, for example, nitrated and halogenated aromatic hydrocarbons having up to 12 carbon atoms such as nitrobenzenes, nitrotoluenes, dichlorobenzenes, dibromobenzene; alkanes and substituted alkanes, having up to 16 carbon atoms, such as n-pentanes, isopentate, n-hexane, 2-methylpentane, n-heptane, 3,4-dimethylhexane, 2-methylhexane, 3-ethylpentane, cyclopentane, cyclohexane, methylcyclohexane, ethylcyclopentane, cyclooctane, chloroform, carbon tetrachloride, dichloroethane, etc.; lower aliphatic acids having up to 8 carbon atoms, such as acetic propionic, etc., and lower aliphatic alcohols, having up to 8 carbon atoms, such as methanol, ethanol, propanols, butanols, etc. Nitrobenzene and dichlorobenzene are the preferred solvents. Gerater amounts of solvent may be employed but generally are not necessary due to the added burden of recovery. While as indicated above, mixtures of solvents may be employed, it is preferable to use individual solvents in order to alleviate any recovery problems.

The reaction of the present invention will proceed at temperatures of from ambient to 170° C. It is generally preferred to operate the process at temperatures of from about 50° C. to 130° C. to obtain a convenient rate of reaction and conversion of the N-aryl carbamate.

The process of the present invention is generally carried out at atmospheric pressure although higher pressures may be used at the higher reaction temperatures. Subatmospheric pressures may also be employed in the process, if desirable.

The reaction time is generally dependent upon the N-aryl carbamate being reacted, the reaction temperature and on the type and amount of graphite-Lewis acid intercalation compound catalyst being employed and will vary depending on whether the process is continuous or batch but will generally range between a few minutes and several hours.

The following Examples are provided to illustrate the invention in accordance with the principles of this invention but are not to be construed as limiting the invention in any way except as indicated by the appended claims.

In Examples 1 to 8 which follow, the reactions were run in a 100 ml. or appropriate size three neck glass reaction flask fitted with a mechnical stirrer, reflux condenser and thermometer. The reactants, solvent if any, plus catalyst were charged to the reaction flask and the flask immersed into a constant temperature oil bath. At the end of the reaction the reaction mixture was filtered in order to remove the solid catalyst. Solvent, if present, was removed by vacuum distillation. Conversion of the N-aryl carbamate charged and condensation product yield and polymer distribution were determined by high speed liquid chromatography.

In Examples 9 to 11 directed to a continuous method of carrying out the process of the invention, a 1" diameter × 10" long cylindrical glass column was packed with 5" bed of the graphite-Lewis acid intercalation compound catalyst. A feed of carbamate, solvent and carbonyl compound such as trioxane, for example, was pumped upward through the column and bed of catalyst. Temperature was maintained by a constant temperature circulating oil jacket around the column. The reaction product was collected in a receiver at the top of the column and analyzed by high speed liquid chromatography.

EXAMPLE 1

A mixture of 0.38 g. of trioxane, 9.0 g. nitrobenzene, 9.0 g. ethylphenylcarbamate, and 3.0 g. of 15 percent $FeCl_3$ intercalated in graphite (Ventron Corp., Alfa Division "GRAPHIMET $FeCl_3$-15") catalyst was added to the reaction flask and heated to a temperature of 100° C. on an oil bath for 30 minutes. After cooling the mixture was filtered to remove the catalyst and the nitrobenzene removed by vacuum distillation. The resulting product analyzed by high speed liquid chromatography showed a 43 percent conversion of the ethylphenylcarbamate with weight selectivity to the diphenylmethane dicarbamates of 61 percent and to the N-benzyl impurities of 25 percent and the remaining 14 percent to higher homologs and derivatives. The reaction product was again contacted with a fresh charge of 3.0 g. of 15 percent $FeCl_3$ in graphite (GRAPHIMET $FeCl_3$-15) at 100° C. to convert the N-benzyl content to the desired carbamates. Further analysis showed an N-benzyl compound conversion of 98 percent giving a product containing 0.5 percent N-benzyl compounds.

EXAMPLES 2 to 8

In Examples 2 to 8, which follow in Table 1 below, the general procedure of Example 1 was repeated using various N-aryl carbamates, graphite intercalated with a Lewis acid catalyst, solvents and reaction conditions except that the condensation reaction product analyzed by high speed liquid chromatography was not further treated to convert N-benzyl compounds to the carbamates.

TABLE 1

| 1 | 2 | 3 | 4 | 5 | 6 | 7 | 8 | 9(5) | 10 | 11 |
|---|---|---|---|---|---|---|---|---|---|---|
| 2 | 50% $SbF_5$ (2.0 g.) | trioxane(1) (1.14 g.) | $EPC^{(2)}$ (9.0 g.) | nitrobenzene (9.0 g.) | 80 | 30 | 43 | 79 | 4 | 19 |
| 3 | 35% $AlCl_3$ (2.0 g.) | trioxane (0.38 g.) | EPC (9.0 g.) | nitrobenzene (9.0 g.) | 80 | 30 | 40 | 46 | 24 | 30 |
| 4 | 15% $FeCl_3$ (2.0 g.) | trioxane (0.38 g.) | EPC (9.0 g.) | nitrobenzene (9.0 g.) | 100 | 30 | 38 | 61 | 25 | 14 |
| 5 | 10% $CuCl_2$ (8.0 g.) | paraformaldehyde (0.38 g.) | $BPC^{(3)}$ (10.5 g.) | o-dichlorobenzene (10.5 g.) | 100 | 60 | 38 | 50 | 30 | 20 |
| 6 | 10% $CoCl_2$ (5.0 g.) | trioxane (0.38 g.) | $MPC^{(4)}$ (8.25 g.) | 1,2-dichloroethane (8.25 g.) | 140 | 30 | 40 | 57 | 25 | 18 |
| 7 | 15% $CrCl_3$ (5.0 g.) | paraformaldehyde (0.38 g.) | EPC (6.0 g.) | nitrobenzene (6.0 g.) | 125 | 60 | 41 | 54 | 22 | 24 |
| 8 | 50% $SbF_5$ (2.0 g.) | 50% Aqueous Formaldehyde (0.76 g.) | EPC (6.0 g.) | none | 90 | 30 | 43 | 75 | 5 | 20 |

(1)33% trioxane in nitrobenzene;
(2)ethylphenyl carbamate (EPC);
(3)1-butyl-N-phenylcarbamate (BPC);
(4)methyl-N-phenylcarbamate (MPC);
(5)selectivity to diphenylmethane dicarbamates
COLUMN HEADINGS
1 - Example No.
2 - % Lewis Acid Catalyst Intercalated in Graphite (g.)
3 - Carbonyl Compound (g.)
4 - N-Aryl Carbamate (g.)
5 - Solvent (g.)
6 - Temperature °C.
7 - Time (mins.)
8 - % N-Aryl Carbamate Conversion
9 - % Selectivity to Dicarbamates
10 - % Selectivity to N-Benzyl Compounds
11 - % Selectivity to Higher Homologs

EXAMPLES 9 to 11

Examples 9 to 11 are directed to a continuous method of carrying out the process of the invention and employ a cylindrical glass column packed with a 5" bed of graphite intercalated with a Lewis acid catalyst through which an upward flow of feed consisting of ethylphenylcarbamate 48.3 percent, nitrobenzene solvent 48.3 percent and 3.4 percent trioxane was pumped while reaction temperature was maintained with a circulating oil jacket. Condensation reaction product was collected at the top of the column and analyzed by high speed liquid chromatography. The reaction conditions and results are shown in Table 2.

TABLE 2

| Example No. | Catalyst | Residence Time (mins.) | Temp. °C. | % N-Aryl Carbamate Conversion | % Selectivity to Dicarbamates | N-benzyls | Higher Homologs |
| --- | --- | --- | --- | --- | --- | --- | --- |
| 9 | 50% SbF$_5$/Graphite | 45 | 60 | 60 | 58 | 10 | 32 |
| 10 | 35% AlCl$_3$/Graphite | 60 | 100 | 59 | 51 | 21 | 28 |
| 11 | 15% FeCl$_3$/Graphite | 60 | 125 | 61 | 50 | 26 | 24 |

I claim:

1. A process for the preparation of diphenylmethane dicarbamates and polymethylene polyphenyl carbamates which comprises reacting an N-aryl carbamic acid ester with a carbonyl compound selected from formaldehyde, paraformaldehyde or trioxane or mixtures thereof at a temperature of from about ambient to about 170° C. in the presence of a Lewis acid having a concentration of at least 0.5 weight percent based on the total reaction mixture and intercalated in graphite in an amount of at least about 1 weight percent.

2. A process according to claim 1 wherein the N-aryl carbamic acid ester is selected from the group consisting of ethylphenylcarbamate, 1-butyl-N-phenylcarbamate and methyl-N-phenylcarbamate.

3. A process according to claim 2 wherein the carbamic acid ester is ethylphenylcarbamate.

4. A process according to claim 1 wherein the molar ratio of N-aryl carbamic acid ester to carbonyl compound in the form of free formaldehyde in the reaction mixture is in the range of from about 1.5 to 8:1.

5. A process according to claim 1 wherein the Lewis acid is employed in concentrations of from 0.5 to 30 weight percent based on the total reaction mixture.

6. A process according to claim 1 wherein the Lewis acid is intercalated in graphite in an amount of from about 1 to 50 weight percent.

7. A process according to claim 1 wherein the Lewis acid intercalated in graphite is selected from antimony pentafluoride, aluminum chloride, iron chloride, cupric chloride, cobalt chloride or chromium chloride.

8. A process according to claim 7 wherein the Lewis acid is antimony pentafluoride.

9. A process according to claim 7 wherein the Lewis acid is aluminum chloride.

10. A process according to claim 7 wherein the Lewis acid is iron chloride.

11. A process according to claim 1 wherein the reaction is carried out at a temperature in the range of from about 50° C. to 130° C.

12. A process according to claim 1 wherein the reaction is carried out in the presence of an inert solvent selected from the group consisting of nitrated and halogenated hydrocarbons having up to 12 carbon atoms, alkanes and substituted alkanes having up to 16 carbon atoms, lower aliphatic acids and lower aliphatic alcohols having up to 8 carbon atoms.

13. A process according to claim 8 wherein the solvent is nitrobenzene, dichlorobenzene or dichloroethane.

14. A process according to claim 9 wherein the solvent is nitrobenzene.

15. A process for the preparation of diphenylmethane dicarbamate, diethyl ester, which comprises reacting ethylphenylcarbamate with a carbonyl compound selected from formaldehyde, paraformaldehyde or trioxane at a temperature of from about 50° C. to 130° C. in the presence of a Lewis acid having a concentration of about 0.5 to 30 weight percent based on the total reaction mixture and intercalated in graphite in an amount of from about 1 to 50 weight percent.

* * * * *